United States Patent [19]
Lotspiech et al.

[11] Patent Number: 6,118,873
[45] Date of Patent: Sep. 12, 2000

[54] SYSTEM FOR ENCRYPTING BROADCAST PROGRAMS IN THE PRESENCE OF COMPROMISED RECEIVER DEVICES

[75] Inventors: Jeffrey Bruce Lotspiech; Kevin Snow McCurley, both of San Jose, Calif.

[73] Assignee: International Business Machines Corporation, Armonk, N.Y.

[21] Appl. No.: 09/065,938

[22] Filed: Apr. 24, 1998

[51] Int. Cl.$^7$ .................................................. H04L 9/08
[52] U.S. Cl. .......................................... 380/277; 380/239
[58] Field of Search ................................... 380/239, 240, 380/277

[56] References Cited

U.S. PATENT DOCUMENTS

| | | | |
|---|---|---|---|
| 4,694,491 | 9/1987 | Horne et al. | 380/239 |
| 5,345,505 | 9/1994 | Pires | 380/239 |
| 5,592,552 | 1/1997 | Fiat | 380/21 |

OTHER PUBLICATIONS

Internet "Copy Protection Gets Serious Illegal Copying of Movies and Music", Feb. 19, 1998. (http://cnn.com).
Internet "Technology of the Year Firewire/IEEE 1394", Mar. 3, 1998. (http://newmedia.com).

*Primary Examiner*—Gilberto Barrón, Jr.
*Attorney, Agent, or Firm*—John L Rogitz; David A. Hall

[57] ABSTRACT

A digital broadcast system provides secure transmission of digital programs to in-home digital devices even when some of the devices are unauthorized. A matrix of device keys $S_{j,i}$ is provided, wherein "i" is a key index variable indicating a position in a key dimension of the matrix and "j" is a sets index variable indicating a position in a sets dimension of the matrix. Each in-home device is assigned plural device keys from the matrix, with one and only one device key for each key index variable "i" being assigned to a device. To generate a session key for a broadcast program, session numbers $x_i$ are encrypted with all device keys $S_{j,i}$ to generate a session key block which is decrypted by the in-home devices and used to generate a session key for decrypting the program. If one of the devices is a compromised device, at least one of the session numbers is a dummy number that is encrypted and decrypted by the corresponding compromised device key, with the resulting session key being useless in decrypting the program.

26 Claims, 6 Drawing Sheets

Calculate Session Key Message

42

| $E(x_1,S_{1,1})$ | $E(x_2,S_{1,2})$ | $E(x_3,S_{1,3})$ | $E(x_4,S_{1,4})$ | $E(x_5,S_{1,5})$ | $E(x_6,S_{1,6})$ | $E(x_7,S_{1,7})$ |
|---|---|---|---|---|---|---|
| $E(x_1,S_{2,1})$ | $E(x_2,S_{2,2})$ | $E(x_3,S_{2,3})$ | $E(x_4,S_{2,4})$ | $E(x_5,S_{2,5})$ | $E(x_6,S_{2,6})$ | $E(x_7,S_{2,7})$ |
| $E(x_1,S_{3,1})$ | $E(x_2,S_{3,2})$ | $E(x_3,S_{3,3})$ | $E(x_4,S_{3,4})$ | $E(x_5,S_{3,5})$ | $E(x_6,S_{3,6})$ | $E(x_7,S_{3,7})$ |
| $E(x_1,S_{4,1})$ | $E(x_2,S_{4,2})$ | $E(x_3,S_{4,3})$ | $E(x_4,S_{4,4})$ | $E(x_5,S_{4,5})$ | $E(x_6,S_{4,6})$ | $E(x_7,S_{4,7})$ |
| $E(x_1,S_{5,1})$ | $E(x_2,S_{5,2})$ | $E(x_3,S_{5,3})$ | $E(x_4,S_{5,4})$ | $E(x_5,S_{5,5})$ | $E(x_6,S_{5,6})$ | $E(x_7,S_{5,7})$ |
| $E(x_1,S_{6,1})$ | $E(x_2,S_{6,2})$ | $E(x_3,S_{6,3})$ | $E(x_4,S_{6,4})$ | $E(x_5,S_{6,5})$ | $E(x_6,S_{6,6})$ | $E(x_7,S_{6,7})$ |
| $E(x_1,S_{7,1})$ | $E(x_2,S_{7,2})$ | $E(x_3,S_{7,3})$ | $E(x_4,S_{7,4})$ | $E(x_5,S_{7,5})$ | $E(x_6,S_{7,6})$ | $E(x_7,S_{7,7})$ |
| $E(x_1,S_{8,1})$ | $E(x_2,S_{8,2})$ | $E(x_3,S_{8,3})$ | $E(x_4,S_{8,4})$ | $E(x_5,S_{8,5})$ | $E(x_6,S_{8,6})$ | $E(x_7,S_{8,7})$ |

| $E(x_1,S_{1,1})$ | $E(x_2,S_{1,2})$ | $E(x_3,S_{1,3})$ | $E(x_4,S_{1,4})$ | $E(x_5,S_{1,5})$ | $E(x_6,S_{1,6})$ | $E(x_7,S_{1,7})$ |
|---|---|---|---|---|---|---|
| $E(x_1,S_{2,1})$ | $E(x_2,S_{2,2})$ | $E(x_3,S_{2,3})$ | $E(x_4,S_{2,4})$ | $E(x_5,S_{2,5})$ | $E(x_6,S_{2,6})$ | $E(x_7,S_{2,7})$ |
| $E(x_1,S_{3,1})$ | $E(x_2,S_{3,2})$ | $E(x_3,S_{3,3})$ | $E(x_4,S_{3,4})$ | $E(x_5,S_{3,5})$ | $E(x_6,S_{3,6})$ | $E(x_7,S_{3,7})$ |
| $E(x_1,S_{4,1})$ | $E(x_2,S_{4,2})$ | $E(x_3,S_{4,3})$ | $E(x_4,S_{4,4})$ | $E(x_5,S_{4,5})$ | $E(x_6,S_{4,6})$ | $E(x_7,S_{4,7})$ |
| $E(x_1,S_{5,1})$ | $E(x_2,S_{5,2})$ | $E(x_3,S_{5,3})$ | $E(x_4,S_{5,4})$ | $E(x_5,S_{5,5})$ | $E(x_6,S_{5,6})$ | $E(x_7,S_{5,7})$ |
| $E(x_1,S_{6,1})$ | $E(x_2,S_{6,2})$ | $E(x_3,S_{6,3})$ | $E(x_4,S_{6,4})$ | $E(x_5,S_{6,5})$ | $E(x_6,S_{6,6})$ | $E(x_7,S_{6,7})$ |
| $E(x_1,S_{7,1})$ | $E(x_2,S_{7,2})$ | $E(x_3,S_{7,3})$ | $E(x_4,S_{7,4})$ | $E(x_5,S_{7,5})$ | $E(x_6,S_{7,6})$ | $E(x_7,S_{7,7})$ |
| $E(x_1,S_{8,1})$ | $E(x_2,S_{8,2})$ | $E(x_3,S_{8,3})$ | $E(x_4,S_{8,4})$ | $E(x_5,S_{8,5})$ | $E(x_6,S_{8,6})$ | $E(x_7,S_{8,7})$ |

*FIG. 8*

Conditional Calculate Session Key Message

Change Session Key Message

Update Device Key Message

SYSTEM FOR ENCRYPTING BROADCAST PROGRAMS IN THE PRESENCE OF COMPROMISED RECEIVER DEVICES

BACKGROUND OF THE INVENTION

1. Field of the Invention

The present invention relates generally to data encryption, and more particularly to the encryption of broadcast programs such that unauthorized clone receivers cannot easily decrypt the programs.

2. Description of the Related Art

To prevent the unauthorized viewing and/or copying of, e.g., satellite or cable pay-per-view broadcast programs by non-paying customers, such programs typically are encrypted. Authorized customers are provided with so-called "set top boxes" that decrypt the programs in accordance with decryption algorithms inside the boxes. Various billing schemes are tied to the set-top boxes or other customer identification to ensure that authorized customers are billed for the programs they receive.

While effective for blocking access to many non-paying customers, such boxes can be cloned using relatively sophisticated cloning techniques, then sold to people who can then use the clones to watch and/or copy for free the otherwise pay-per-view programs. While it is occasionally possible to discover a single clone box, most remain undetected in users' homes, leading to a loss of revenue for the broadcasters.

This loss of revenue is a growing problem, particularly with the growth of in-home digital video devices, because digital copies are perfect copies. Indeed, the growth of digital video has led to the introduction of a new digital bus standard referred to both as "Firewire" and "IFEEE 1394", which has been proposed to standardize the interconnections between a user's digital television, digital video cassette recorder (VCR), digital video disk (I)VD) player, and set-top box.

Because millions of set-top boxes might use the same decryption algorithm keys, it is not feasible to individually reprogram each authorized device with new decryption algorithm keys. Indeed, the only feasible way to reprogram millions of in-home decryption receivers of pay-per-view programs is to broadcast a new encryption algorithm key, but the unauthorized clones also receive the broadcast of the new key, leading to the classic broadcast encryption conundrum: how can authorized receivers be efficiently reprogrammed with new decryption keys while disenfranchising unauthorized clones? It is to this problem that the present invention is addressed.

Accordingly, it is an object of the present invention to provide an encryption system for the secure broadcasting of programs. Another object of the present invention is to provide an encryption system that can broadcast encryption updates to authorized in-home digital video devices. Still another object of the present invention is to provide an encryption system that can update the encryption algorithms of authorized in-home digital video devices while preventing known unauthorized devices from being effectively updated. Yet another object of the present invention is to provide an encryption system for the secure broadcasting of programs that is easy to use and cost-effective.

SUMMARY OF THE INVENTION

A system is disclosed for encrypting one or more broadcast programs. The system includes plural user devices, each of which includes plural computer-usable device keys selected from a set of device keys. A session key block generator encrypts plural session numbers with the set of device keys to render a session key block, and at least one of the session numbers can be a dummy number when it is determined that at least one of the devices is a compromised device defining compromised device keys. The dummy number is encrypted by a compromised device key, and the session key block then transmitted for use in decrypting the program. A decryption module that is accessible to each user device can access the device keys of the device to determine a session key based on the session key block and the respective device keys of the device. This session key is usable by a user device to decrypt the program, unless the device has a compromised device key that consequently decrypts and uses the dummy number to generate the session key.

In a preferred embodiment, the set of device keys is representable by at least a two-dimensional matrix including a key dimension and a sets dimension. The key dimension represents "N" key positions, each represented by a key index variable "i", and the sets dimension represents "M" sets, each represented by a sets index variable "j", such that each device key can be represented by the notation $S_{j,i}$. In accordance with principles set forth more fully below, no two device keys of a device have the same key index variable "i" as each other.

In the preferred embodiment, a respective session number is provided for each key index variable "i" such that each session number can be represented by $x_i$. Each session number $x_1$ is encrypted only by device keys in the $i^{th}$ key dimension to render the session key block. Furthermore, each device uses its respective ith device key $S_{j,i}$ to decrypt the $i^{th}$ session number, such that all devices not having the compromised device key generate at least a first session key and all devices having the compromised device key generate at least a second session key, only the first session key being useful in decrypting the program.

In a particularly preferred embodiment, devices that generate the first session key define a first pool and devices that generate the second session key define a second pool. Computer readable code means determine whether all devices in the first pool are not compromised devices and, if they are not compromised, encrypted renewal data is sent to all devices, only devices in the first pool are able to decrypt the renewal data and act on it correctly. The devices operate on the renewal data to generate new device keys. Moreover, computer readable code means determine whether all devices in the second pool are compromised devices and, if not, devices in the second pool are caused to generate a new session key using a different compromised device key.

In a still further feature of the preferred embodiment, a first set of non-compromised devices defines the first pool and a second set of non-compromised devices defines a third pool, such that each of the first and third pools do not contain any compromised device. To conserve bandwidth under such circumstances, computer readable code means cause devices in the first pool to replace their session key with the session key of the devices in the third pool. A computer-implemented method that undertakes the function of the system summarized above is also disclosed.

In another aspect, the invention is a general purpose computer programmed according to the inventive steps herein to encrypt broadcast data. The invention can also be embodied as an article of manufacture—a machine component—that is used by a digital processing apparatus and which tangibly embodies a program of instructions that are executable by the digital processing apparatus to encrypt broadcast transmissions. This invention is realized in a critical machine component that causes a digital processing apparatus to perform the inventive method steps herein.

In accordance with the present invention, the method steps include accessing a matrix of device keys $S_{j,i}$, wherein i= the integers from 1 to N inclusive and j= the integers from 1 to M inclusive. In accordance with present principles, "i" is a key index variable indicating a position in a key dimension of the matrix "j" is a sets index variable indicating a position in a sets dimension of the matrix, and "N" is the number of device keys in each of "M" sets of keys. Respective plural device keys from the matrix of device keys are assigned to a plurality of digital video devices, each of which is assigned one and only one device key for each key index variable "i". Furthermore, plural session numbers $x_i$ are generated, i=1 to N, and each session number $x_i$ corresponds to a respective key index variable "i". Each session number $x_i$ is encrypted with all device keys $S_{j,i}$, j=1 to M, to generate a session key block.

In another aspect, a decryption module is disclosed for a digital video device that is configured for receiving and presenting at least one digital program. The module includes computer readable code means for receiving a session key block that is representable by a matrix having at least dimensions "i" and "j". The session key block includes encrypted session numbers $x_i$, i=1 to N, wherein each session key number $x_i$ is encrypted by "j" device keys $S_{j,i}$, j=1 to M. As used herein, "N" is the number of device keys in each of "M" sets of keys. Computer readable code means access plural local device keys, it being understood that the video device is assigned one and only one local device key for variable "i". Also, computer readable code means are provided for decrypting a session key from the session key block using the local device keys. A computer program product is also disclosed that has code means for undertaking the functions of the decryption module.

The details of the present invention both as to its structure and operation, can best be understood in reference to the accompanying drawings, in which like reference numerals refer to like parts, and in which:

BRIEF DESCRIPTION OF THE DRAWINGS

FIG. 5 is a diagram of a session key block;

FIG. 8 is a diagram of the session key block generated by the logic of FIG. 7;

DETAILED DESCRIPTION OF THE PREFERRED EMBODIMENTS

Figures 1, 2, 3:
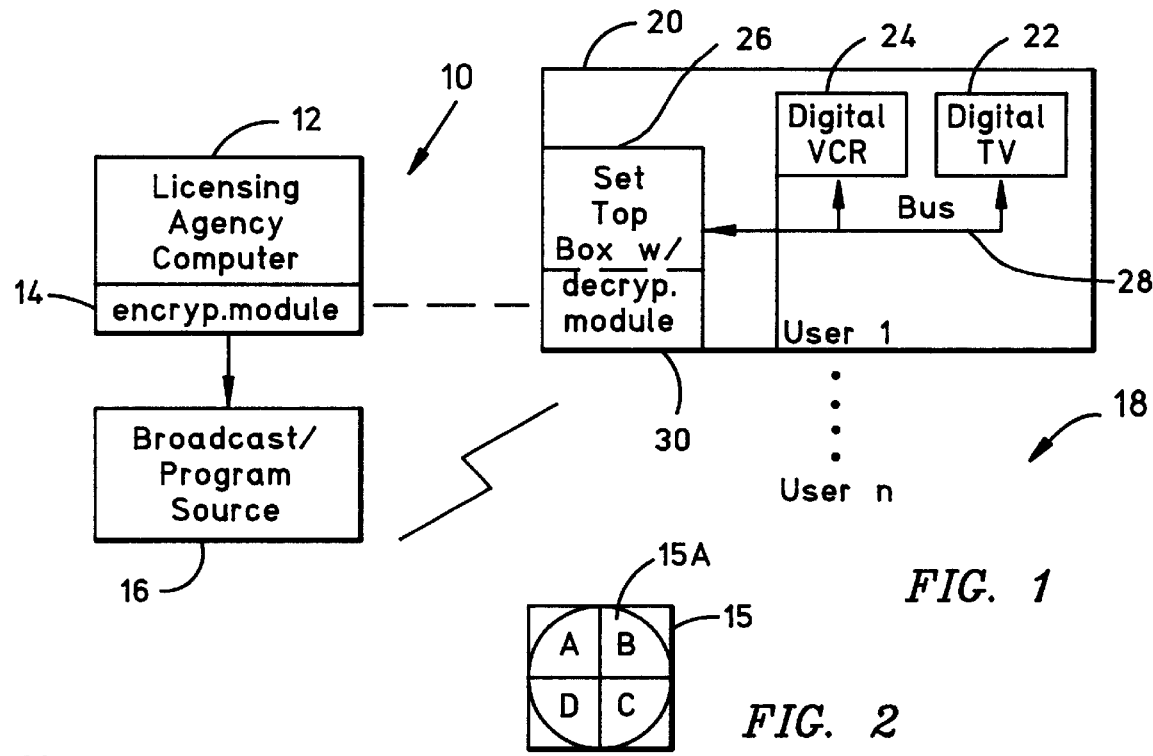
FIG. 1 is a block diagram of the present broadcast encryption system.
FIG. 2 is a schematic diagram of a computer program product.
FIG. 3 is a diagram of a device key matrix.

Referring initially to FIG. 1, a system for securely broadcasting programs is shown, generally designated 10. By "broadcast" is meant the wide dissemination of a program to many users simultaneously over cable, or wire, or radiofrequency. In the particular architecture shown, the system 10 includes a licensing agency computer, that is, a digital processing apparatus, 12. In one intended embodiment, the computer 12 may be a personal computer made by International Business Machines Corporation (IBM) of Armonk, N.Y. as shown, or the computer 12 may be any computer, including computers sold under trademarks such as AS400 with accompanying IBM Network Stations. Or, the computer 12 may be a Unix computer, or OS/2 server, or Windows NT server, or IBM RS/6000 250 workstation with 128 MB of main memory running AIX 3.2.5., or an IBM laptop computer.

The computer 12 includes an encryption module 14 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 15 shown in FIG. 2 having a computer usable medium 15A with code elements A–D stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

Indeed, the flow charts herein illustrate the structure of the modules of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

As shown in FIG. 1, the encryption module 14 accesses and indeed can be a component of a broadcast program source 16. Per the present invention, the encryption module 14 provides encryption data that is used to encrypt one or more programs that are broadcast by the broadcast program source 16, for secure transmission thereof to plural user video devices 18 via cable, wire, or wireless broadcast means.

FIG. 1 shows an exemplary first user having a video device 20 that can communicate with a digital television 22 and a digital video cassette recorder (VCR) 24. The device 20 includes a set top box 26, and the television 22, VCR 24, and set top box 26 communicate with each other via a bus 28. Thus, at a minimum, a device 18 includes a set top box 26 or its equivalent. Although not shown the user device 20 can also include a digital video disk (DVD) player. In one intended environment, the bus 28 is a so-called "Firewire" or "IEEE 1394" digital video data bus. It is to be understood that while the present invention contemplates that the user device 20 is an in-home digital system, the principles disclosed herein apply to analog in-home systems as well.

The above-described components can be conventional digital video components; the set top box 26 includes a novel decryption module 30 of the present invention. In certain applications, e.g., the above-mentioned Firewire application, other components such as the TV 22 and VCR 24 can include the module 30. The decryption module 30 is the complement of the encryption module 14, in that the decryption module 30 decrypts, in accordance with the logic described below, the broadcast program that is encrypted using the encryption data from the encryption module 14.

In accordance with the present invention, each user device 18 is provided with plural device keys. Each device key is a random number of predetermined bit size, with the predetermined bit size of the presently preferred embodiment being sixty four (64). The device keys of a particular device 18 are accessible to the respective decryption module 30, and the entire set of device keys used in the system 10 are accessible to the encryption module 14, for purposes to be shortly disclosed. Additionally, the licensing agency retains a list of the respective subset of device keys that is given to each device 18.

FIG. 3 shows a two-dimensional matrix, generally designated 32, that represents the entire set of device keys of the system 10. In the figures, the device keys are denoted by the symbol $S_{j,i}$, wherein i= the integers from 1 to N inclusive and j= the integers from 1 to M inclusive. In accordance with present principles, "i" is a key index variable indicating a position in a key dimension 34 of the matrix 32 and "j" is a sets index variable indicating a position in a sets dimension 36 of the matrix 32.

Furthermore, "N" is the number of device keys "S" in each of "M" sets of keys. Stated differently, "N" is the cardinality of the device dimension 34 and "M" is the cardinality of the sets dimension 36. In FIG. 3, seven sets of keys "S" are provided (i.e., M=7), with each set containing eight keys (i.e., N=8). It is to be understood, however, that only 56 keys are shown in FIG. 3 for brevity and clarity of disclosure, and that in the preferred embodiment, one hundred twenty eight (128) keys are provided in each of thirty two (32) sets of keys. It is to be further understood that greater or lesser values for the cardinalities of the dimensions 34, 36 are within the scope of the present invention.

As intended by the present invention, each user device 18 is assigned selected keys "S" from the matrix 32 by the licensing agency. For example, the first user device 20 might be assigned the keys $S_{3,1}$, $S_{5,2}$, $S_{1,3}$, $S_{1,4}$, $S_{6,5}$, $S_{4,6}$, and $S_{8,7}$. In any case, each user device 18 is assigned "N" device keys, and each device 18 is assigned one and only one device key "S" for each key index variable "i". Embodiments, however, wherein a device might not include a device key for each and every $i^{th}$ position are within the scope of this invention. In any case, no single device 18 learns two keys at the same position in the key index dimension. Preferably, no device 18 has exactly the same device keys "S" as any other device, although the device keys of many devices might overlap.

Figure 4:
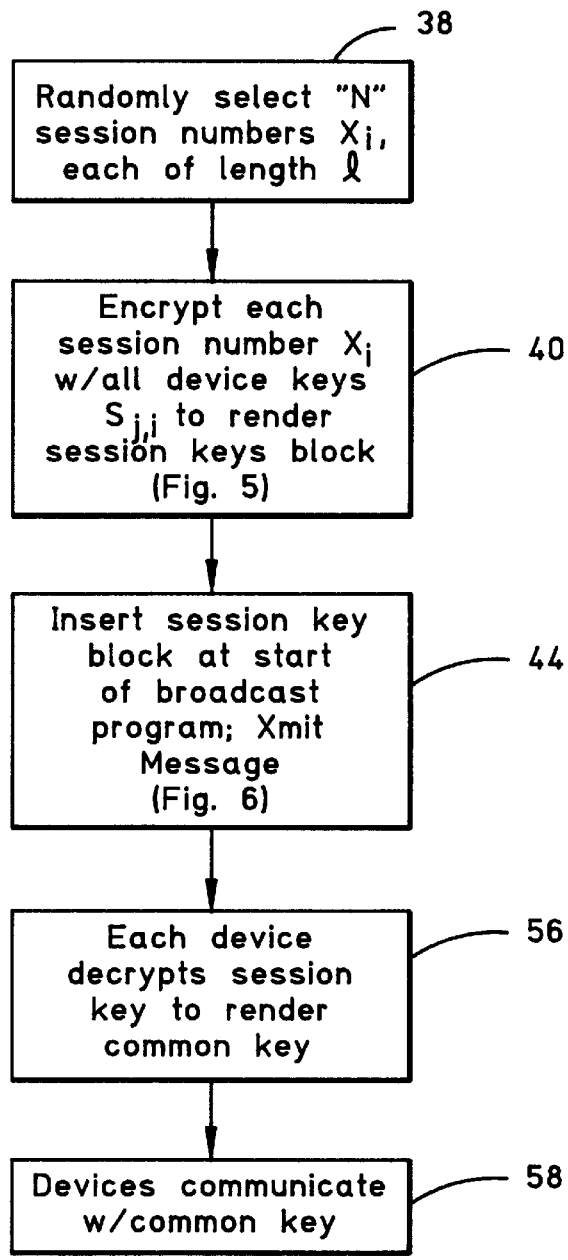
FIG. 4 is a flow chart of the logic for encrypting, transmitting, and decrypting to user devices a session key for use in the subsequent decryption of broadcast programs.

Once the device keys "S" of the devices 18 have been assigned and the devices 18 placed in use, programs, including digital video programs, can be securely transmitted from the source 16 to the various user video devices 18 using the logic shown in FIG. 4. Commencing at block 38, "N" session numbers "$x_i$" are randomly generated, each session number having a length "1". In one preferred embodiment, the length "1" of each session number "x" is sixty four (64) bits. Then, at block 40 each session number $x_i$ is encrypted "M" times, once with each $i^{th}$ device key $S_{j,i}$, j=1 to M, to render "M" versions of the session number $x_i$.

Figure 6:
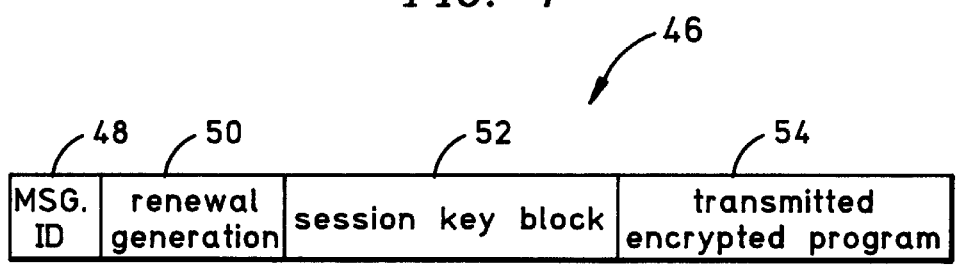
FIG. 6 is a diagram of the calculate session key message.

The result of block 40 is a matrix 42 shown in FIG. 5. The matrix 42 defines a session key block including plural encrypted versions (denoted "$E(x_i, S_{j,i})$") of each session number $x_i$. Thus, the logic at least at block 40 establishes a session key block generator. It can be appreciated by those skilled in the art that the size of the matrix 42 shown in FIG. 5 is the same as that of the matrix 32 shown in Figure Moving to block 44 in FIG. 4, the session key block is inserted into the broadcast data stream at the start of an encrypted program. In this regard, FIG. 6 shows one particular message format, generally designated 46, for instructing the devices 18 to calculate a session key that has been used for encrypting the program and that consequently can be used to decrypt the program.

The particular message 46 shown includes a message identification field 48, identifying the type of message, followed by a thirty two (32) bit renewal generation number field 50. Each device 18 determines whether the renewal generation number matches the renewal at which the particular device 18 is, and if so, the device 18 considers the message. Otherwise, the device 18 ignores the message. As described further below, in the presence of unauthorized devices the system 10 renews the device keys "S", and the renewal generation number refers to the number of times the keys of a device have been renewed.

Following the renewal generation number field 50 is a session key block field 52, containing the session key block described above. The encrypted program establishes the body 54 of the message.

When a device at the appropriate renewal generation number receives the Calculate Session Key Message 46, the respective decryption module 30 invokes the logic represented at block 56 in FIG. 4. At block 56, the device 18 decrypts a session key from the session key block for in turn decrypting the broadcast program. To do this, the device uses its device keys $S_{j,i}$, i=1 to N, to decrypt the respective $i^{th}$ session numbers $x_i$. Each device then hashes all of the decrypted session numbers, e.g., by using an XOR operation on all of the session numbers, to render a session key that is subsequently used as a common key during the broadcast at block 58. Thus, the devices 18 calculate the same session key, but arrive at it using different device keys "S".

Figure 7:
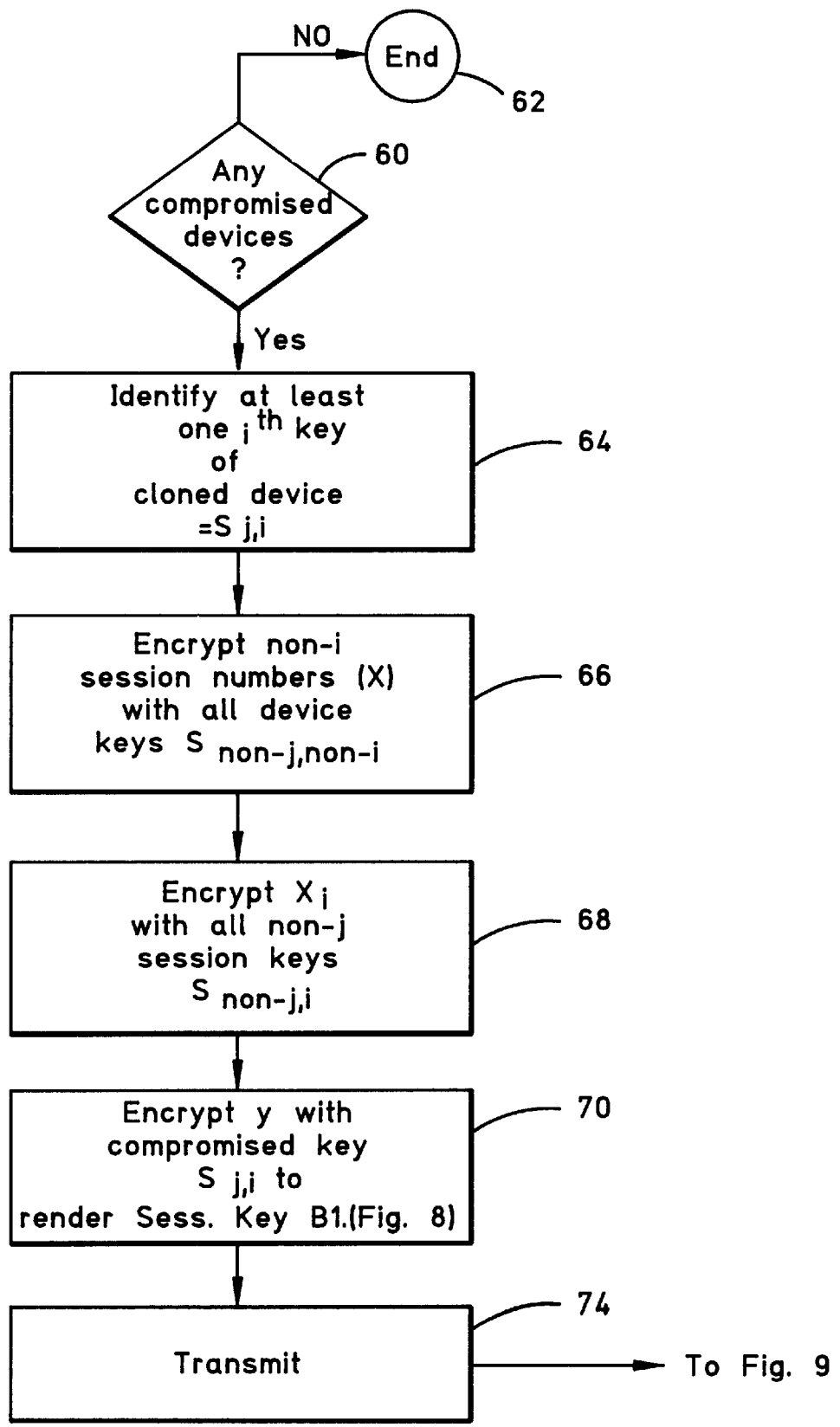
FIG. 7 is a flow chart of the logic for encrypting a predetermined dummy session number using at least one device key that is known to be held by an unauthorized device.

The present invention recognizes that one of the devices 18 can be obtained by a so-called "pirate", who could clone the device, along with its device keys, to render one or more unauthorized devices that undesirably could receive and decrypt the program. It is possible for the licensing agency to learn about such unauthorized devices; the challenge met by the present invention is to send a broadcast message to authorized devices that the unauthorized devices cannot read. The logic undertaken by the present invention for doing so is shown in FIG. 7.

Commencing at decision diamond 60, it is determined whether any devices 18 have been compromised, i.e., whether any unauthorized devices exist. If not, the process ends at state 62, it being understood that the logic shown in FIG. 4 is used to broadcast programs under such circumstances.

On the other hand, when the licensing agency has determined that at least one device 18 has been compromised, the agency accesses the subset of device keys that had been assigned to the compromised device, and then proceeds from decision diamond 60 to block 64 to identify at least one key position, e.g., the $i^{th}$ key position, of the compromised device in which the particular device key $S_{j,i}$ that has been assigned to the compromised device resides. It is to be understood that for clarity of disclosure, it is assumed that only a single device key position of the compromised device is selected as described below. The principles below, however, can be applied to select two or more device key positions and process them simultaneously.

Moving to block 66, the logic envisions encrypting all non-i session numbers $x_{non-i}$ with all non-j (relative to the device key $S_{j,i}$ of the compromised device 18) corresponding device keys $S_{non-j, non-i}$ in accordance with principles discussed above. Also, at block 68 the $i^{th}$ session number $x_i$ is encrypted with all non-j device keys $S_{non-j,i}$. This leaves, as the only session block matrix element left for encryption, the session number at the location at which the selected compromised device key $S_{j,i}$ happens to be.

Accordingly, at block 70 a number is encrypted using the selected compromised $S_{j,i}$, but the number is not the $i^{th}$ session number $x_i$. Rather, it is a dummy number "y". A session key block 72, shown in FIG. 8, consequently is rendered after block 70 and transmitted at block 74 in FIG. 7. As shown, the session key block 72 in FIG. 8 is substantially identical to the session key block 42 shown in FIG. 5 and generated by the logic of FIG. 4, except that the session key block 72 in FIG. 8 includes a dummy position 76, representing an encrypted version of the dummy number "y".

It may now be appreciated that most of the devices 18, which are not expected to possess the selected compromised device key $S_{j,i}$ of the compromised device that occupies the $i^{th}$ position selected at block 64, will successfully decrypt all session numbers "x" and, hence, successfully calculate the session key. In contrast, the compromised device will not decrypt the $i^{th}$ session number $x_i$, but instead will decrypt the dummy number "y". Consequently, the compromised device cannot calculate the correct session key, which can be determined only by combining all of the non-dummy session numbers $x_i$, i=1 to N, and thus cannot decrypt the accompanying message, including the program.

With respect to authorized devices that happen to use the particular selected compromised device key $S_{j,i}$, and that, like the compromised device, consequently cannot calculate the correct session key, recall that no authorized device has exactly the same device keys, key for key, as any other authorized device. With this in mind, the above-described procedure is repeated with one or more of the non-i device keys $S_{j,non-i}$ of the compromised device, until all authorized devices have been given a valid session key.

In undertaking the subsequent iterations, the new session key blocks are made conditional. More specifically, the message accompanying a new session key block instructs the devices to calculate a new session key only if their existing session key is the key that existed prior to the beginning of the procedure shown in FIG. 7. The skilled artisan will recognize that after each iteration, additional authorized devices can calculate the correct session key, with the pool of devices "left in the dark" growing progressively smaller until only the compromised device and its clones do not have the correct session key.

Figure 10:
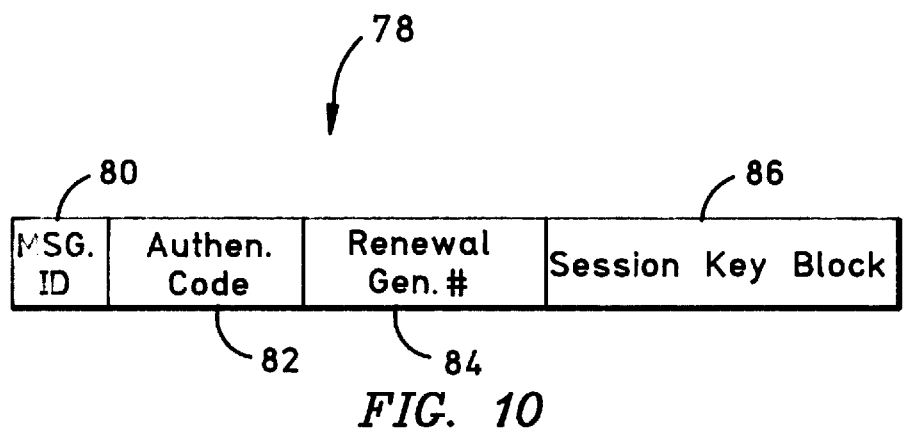
FIG. 10 is a diagram of the conditional calculate session key message.

An example of the format of a Conditional Calculate Session Key message, generally designated 78, is shown in FIG. 10. The message 78 includes a message identification field 80, identifying the type of message, followed by an authentication field 82. The authentication field 82 includes authentication data that can be decrypted only with a predetermined session key. If a device 18, in decrypting the authentication data, generates a predetermined code, e.g., the word "DEADBEEF", the device considers the message 78. Otherwise, the device ignores the message. Following the authentication field 82 is a renewal generation number field 84 that is used as described above in reference to FIG. 6, and then the new session key block field 86.

If desired, the procedure above can be used to isolate more than one compromised device by selecting multiple key positions that differentiate between authorized devices and compromised devices. In any case, once the compromised device has been isolated, the device keys of the authorized devices can be updated using, as an encryption key, the correct session key. Each update increments the renewal cycle number mentioned above.

Figure 9:
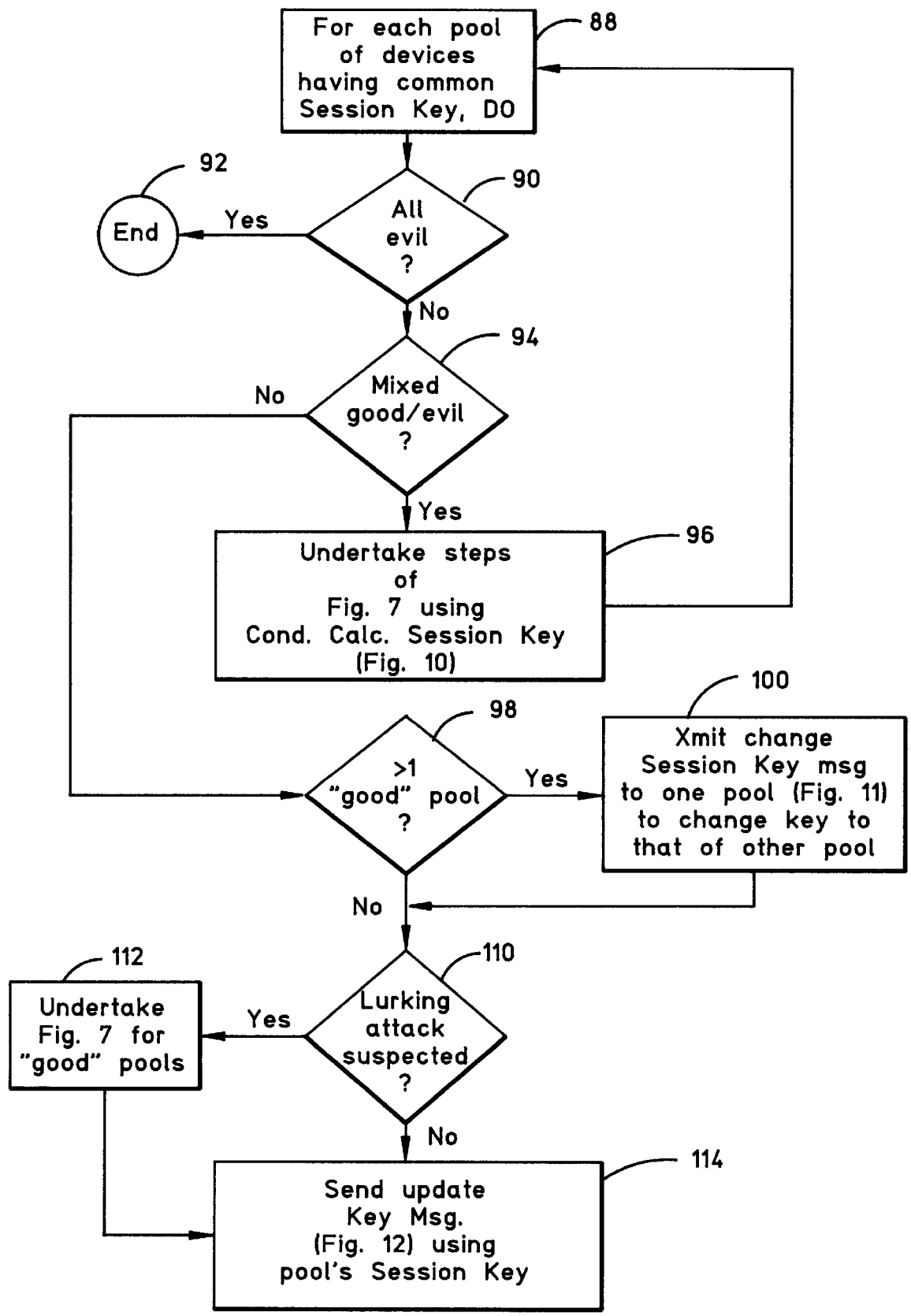
FIG. 9 is a flow chart of the logic undertaken for processing various pools of devices.

FIG. 9 shows the details of the logic discussed in the previous paragraphs.

Commencing at block 88, a "DO" loop is entered for each pool of devices having a common session key (regardless of whether the key is valid). At decision diamond 90, it is determined, by considering the particular device keys of the devices in the pool under test, whether all the devices are compromised (referred to in the drawings as "evil") devices. If so, the logic ends at state 92 without further communicating with the evil devices. Otherwise, the logic moves to decision diamond 94 to determine whether the devices in the pool under test are mixed "good"(i.e., authorized) and evil. If so, as disclosed previously the logic moves to block 96 to iterate using the process shown in FIG. 7, using another compromised key to encrypt the dummy variable "y" and using the Conditional Calculate Session Key message of FIG. 10 to transmit the session key block 72 of FIG. 8. The logic then loops back to block 88 to test for another iteration using the smaller device pools resulting from block 96.

If, on the other hand, the logic determines at decision diamond 94 that all the devices in the pool under test are authorized ("good") devices, the logic moves to decision diamond 98 to determine whether more than one pool having only good devices exists. If so, to conserve bandwidth, the logic moves to block 100 to transmit a Change Session Key message to one pool to change its session key to that of the other "good" pool, thereby avoiding requiring both pools to change their session keys prior to updating the device keys of both pools.

Figure 11:
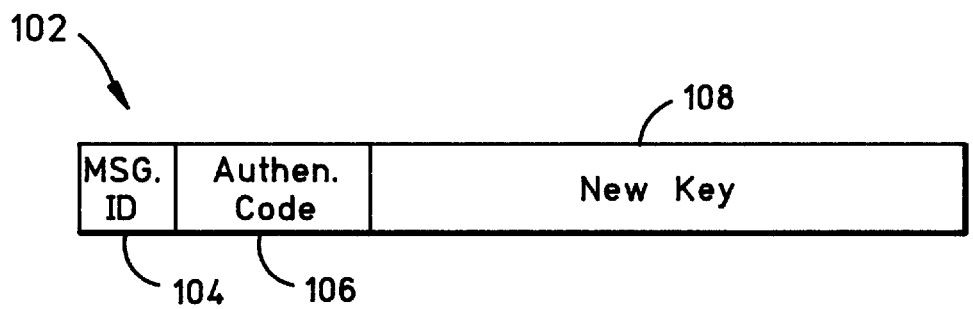
FIG. 11 is a diagram of the change session key message.

FIG. 11 shows a Change Session Key message, generally designated 102, that includes a message identification field 104 and an authentication field 106, in accordance with principles discussed above in reference to FIG. 10. The message 102 also includes a new key field 108 that contains the session key to be used by the pool of devices authenticating the message 102.

If desired, the licensing agency can first update the device key(s) that are unique to the "good" pool that is to retain its session key, to blunt the so-called "lurking" attack described below. More specifically, as recognized by the present invention a pirate might widely clone a first compromised device that, due to its wide cloning, is relatively easily discoverable, while keeping a second compromised device having different keys secret, thereby avoiding detection in an effort to learn updated keys for updating clones of the first compromised device. Accordingly, the logic of the present invention can move from block 100 in FIG. 9 to decision diamond 110, wherein it is determined whether a lurking attack is suspected. If so, the logic proceeds to block 112 to undertake the logic of FIG. 7 for all the "good" pools, in an effort to isolate the lurking compromised device. This is done by ensuring that each pool is not given any extra key renewal data - from key renewal data for keys not used by devices in that pool. Thus, the lurking device will be unable to learn some of the key renewal data for the widely distributed cloned device.

Figure 12:
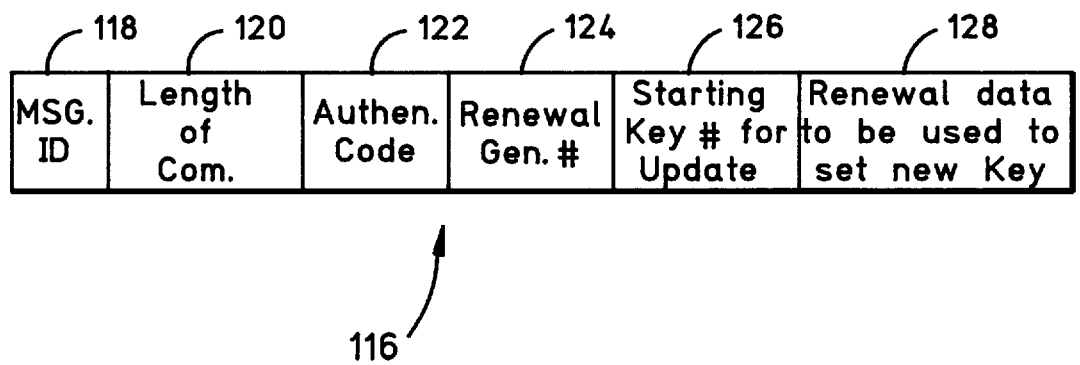
FIG. 12 is a diagram of the update device key message.

From block 112, or from decision diamond 110 if no lurking attack is suspected, the logic concludes at block 114, wherein the device keys of devices in each "good" pool are updated using the pool's session key and the Update Device Key Message, generally designated 116, shown in FIG. 12.

As shown, the message 116 in FIG. 12 includes a message identification field 118, identifying the type of message, followed by a sixteen (16) bit length of communication field 120, indicating the number of remaining encrypted bytes in the message. Following the length of communication field 120 is an authentication field 122 and a renewal generation number field 124, the principles of which have been disclosed above.

Following the renewal generation number field 124 is a starting key field 126. In accordance with the present invention, the starting key field 126 indicates the "i" and "j" values of the first device key to be updated.

Next, the message 116 includes a renewal data field 128 that contains eight (8) bytes per key to be updated. If any of the renewal data contains data that relevant to a particular device 18, the device calculates a combining function on the concatenation of the renewal data at the $i^{th}$ position with its old device key at the $i^{th}$ position. In the preferred embodiment the combining function is XOR, but any function that uses both the old key and the renewal data is suitable and within the scope of this invention. The result is the new $i^{th}$ device key of the particular device 18. Because the licensing agency knows both the old device key and the renewal data, it also knows the new device keys of the devices 18. As recognized herein, an evil device not known to the licensing agency would not learn any more as a result of this step than it already knows.

It is to be understood that messages above can be formatted as appropriate for other applications. A particularly significant application is that of copy protection. Some broadcast programs, such as Hollywood movies, will be designated "do not copy" or "copy once only". It is desirable that legitimately operating devices, such as VCRs, honor these restrictions. This invention is used as follows: legitimate devices, known to operate correctly, are granted device keys as described above. Session key blocks transmitted with the broadcast are passed through from the set-top-box to other components in the home's system. The set-top box encrypts (or re-encrypts) the movie using the session key, and the other devices decrypt it using the present invention. Only legitimate devices that have device keys are then able to view or record the movie, and illegal copies are not possible.

Likewise, if illegitimate recording devices are built that clone a legitimate device's keys, the present invention can be used to update only the legitimate, non-cloned devices. In a preferred embodiment, the devices are connected by the Firewire bus, wherein the present invention serves the function known as the restricted authentication method by which "copy-once" content is protected. The devices 18 using this authentication method are digital video cassette recorders (DVCRs) and digital camcorders. Typically, all other devices use this authentication method only when they are connected to DVCRs and camcorders. Copy-once content would be broadcast preceded by a session key block. The set-top box would transmit the session key block to the DVCR, with the session key block facilitating both sides calculating a common key.

When the licensing agency wants to execute a renewal cycle, all copy-once broadcasts should be preceded by the renewal instructions. The renewal instructions should not be sent for only a single program, but should be repeated for weeks, in case recorders are powered off and not receiving them. Furthermore, once a day (e.g., at 3:00 am) the entire history of all the renewal cycles should be broadcast. Thus a "Rip Van Winkle" device that has been off for a long time can be brought to the current level within 24 hours. Indeed, a "renewal channel" can be provided over which the renewal history is broadcast more frequently.

After a renewal, recorded material whose session keys are in the old generation no longer work. This is not, however, necessarily undesirable, because the purpose of "copy-once mode" is for "time-shifting" (record a program at one time for playback at another), and it is not desirable (from the content owners point of view) that a movie recorded in such a way persist for a long time.

Nevertheless, there can be moments, right on the cusp of a new renewal cycle, that the recording may be too short-lived. To account for this, the license agency can anticipate new renewal cycles, and, immediately prior to a new renewal cycle, send both a session key block for the current generation, and one for the not-yet deployed future generation.

In addition to the "Firewire" bus application, the present invention recognizes that the principles set forth herein can be applied to other broadcast applications including satellite and cable DVD systems, DVD movies, and any other widely distributed multimedia content on the Internet or via any other broadcast distribution medium.

Set forth below is a computer pseudo-code listing embodying the above-disclosed invention.

While the particular SYSTEM FOR ENCRYPTING BROADCAST PROGRAMS IN THE PRESENCE OF COMPROMISED RECEIVER DEVICES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

```
/*
SIZING ASSUMPTIONS:

The following routines already exist; they are needed for other operations
in the protocol. Here are some particular assumptions used in making
this sizing;
*/
```

-continued

```
void *read( );    /* Reads from the bus, returning the current buffer.
                    This routine blocks until data is returned. The blocksize
                    on the bus is max 512 bytes. The buffer management is below
                    this routine, and probably involves ping-pong buffers and
                    a separate thread. We assume that no commands straddle
                    buffer boundaries. Any out of band signals (e.g., bus reset)
                    does not get returned; instead, the whole processor is
                    reset. The buffers are always "long *" aligned. */
void hash(unsigned long *from, unsigned long *to, short length);
                    /* Hashes a given area in memory, setting the hash in the 'to'
                    area. The 'length' is in bytes */
void decrypt(unsigned long *from, unsigned long *to, short length,
             unsigned long *key);
                    /* Decrypts a given buffer. If 'from' and 'to' are the same,
                    decrypts in place. The 'length' is in bytes. The key is always
                    8 bytes (two longs). The decrypt process can generally keep
                    up with the bus (except perhaps if the key is changing frequently) */
#define ntohl (w) (w)
                    /* Converts numbers on the bus to processor-specific format.
                    This converts Big Endian to Little Endian numbers, for example.
                    Assumed to be a no-op in this sizing */
// NVRAM
static unsigned long deviceKeys [32];
static unsigned long globalGeneration;
// ROM; must be different for each device
static const unsigned short keyPosition[33];
        /* word within session key for each word in the device keys.
        Trick: the 33rd position is always larger than the total number of
        keys so we never have to check for running off the end */
void calculateSessionKey(
    long sessionKey[2], // written by routine
    unsigned long *buf) // current contents of buffer
    unsigned long X[32];
    unsigned short word; // unsigned long key position at beginning of buffer
    short i = 0; // index through key words
    unsigned long gen = ntohl(buf[0]);
    gen >>= 8;
    for (word = -1; word < 16*256*2 - 2; word += 128) {
        for (; word + 128 ) > keyPosition[i]; i++) {
            X[i] = ntohl(buf[keyPosition[i] - word]);
        }
        buf = read( );
    }
    if (gen == globalGeneration)
        sessionKey[0] = sessionKey[1] = 0;
        for (i=0; i < 32; i += 2) {
            unsigned long t[2];
            decrypt(&X[i] , t, 8, &deviceKeys[i]);
            sessionKey[0]  ^= t[0];
            sessionKey[i]  ^= t[1];
        }
    }
}
void newSessionKey(
    long sessionKey[2], // set by this routine, if we find dead beef
    unsigned long *buf) // current contents of buffer
{
    decrypt(&buf[1], &buf[i], 16, sessionKey);
    if (buf[i] == 0xDEADBEEF) {
        sessionKey[0] = buf[2];
        sessionKey[1] = buf[3];
    }
}
void updateDeviceKeys(
    long sessionKey[2], // current session key, not changed
    unsigned long *buf) // current contents of buffer
{
unsigned long X[32];
unsigned short word; // length; number of unsigned longs including current buffer
short i = 0; // index through key numbers
unsigned long gen = ntohl(buf[0]);
unsigned long t = ntohl(buf[1]);
unsigned long deadBeef;
unsigned short start = (unsigned short) (t >> 16); // starting key number
unsigned short len = (unsigned short) (t); // number of keys;
gen >>= 8;
decrypt(&buf[2], &buf[2], 504, sessionKey);
deadBeef = buf[2];
for (word start << 1 - 3; ;) {
```

-continued

```
        for (; word + 128 > keyPosition[i]; i++) {
            if (word <= keyPosition[i]) {
                X[i] = ntohl{buf[keyPosition[i] - word]};
            }
        }
        word += 128;
        if (word >= (start + len) << 1 - 3) {
            break;
        }
        buf = read( );
        decrypt(buf, buf, 512, sessionKey);
}
if (deadBeef == 0xDEADBEEF)
    globalGeneration = gen;
    for (i= start >> 8; i <= (start + len) >> 8; i ++) {
        unsigned long t[4];
        short n = keyPosition(i << 1] >> 1;
        if (n < start || n - start >= len) {
            continue;
        }
        t[0] = deviceKeys[i];
        t[1] = deviceKeys[i+1];
        t[2] = X[i];
        t[3] = X[i+1];
        hash(t, &deviceKeys[i], 16);
    }
int main(int argc, char *argv[ ])
{
    return 0;
}
void *read( )
{
    return 0;
}
void hash(unsigned long *from, unsigned long *to, short length)
{
}
void decrypt(unsigned long *from unsigned long *to, short length,
             unsigned long *key)
{
}
```

What is claimed is:

1. A system for encrypting one or more broadcast programs, comprising:

plural user devices, each device including plural computer-usable device keys selected from a set of device keys;

at least one session key block generator for encrypting plural session numbers with the set of device keys to render a session key block, at least one of the session numbers being a dummy number when it is determined that at least one of the devices is a compromised device defining compromised device keys, the dummy number being encrypted by at least one compromised device key, the session key block being transmitted for use in decrypting the program; and a decryption module accessible to each user device and accessing the device keys of the device to determine a session key based on the session key block and the respective device keys of the device, the session key being usable by a user device to decrypt the program unless the device uses the dummy number to generate the session key.

2. The system of claim 1, wherein the set of device keys is representable by at least a two-dimensional matrix including a key dimension and a sets dimension, wherein the key dimension represents "N" key positions each represented by a key index variable "i", and wherein the sets dimension represents "M" sets each represented by a sets index variable "j", such that each device key can be represented by $S_{j,i}$.

3. The system of claim 2, wherein no two device keys of a device have the same key index variable "i" as each other.

4. The system of claim 3, wherein a respective session number is provided for each key index variable "i" such that each session number can be represented by $x_i$, and wherein each session number $x_i$ is encrypted only by device keys in the $i^{th}$ key dimension to render the session key block.

5. The system of claim 4, wherein each device uses its respective $i^{th}$ device key $S_{j,i}$ to decrypt the $i^{th}$ session number, such that all devices not having the compromised device key generate at least a first session key and all devices having the compromised device key generate at least a second session key, only the first session key being useful in decrypting the program.

6. The system of claim 5, wherein devices generating the first session key define at least a first pool and devices generating the second session key define at least a second pool, the system further comprising computer readable code means for determining whether all devices in the first pool are not compromised devices and, if so, sending renewal data to the devices in the first pool, the devices operating on the renewal data to generate new device keys.

7. The system of claim 5, wherein devices generating the second session key define at least a second pool, and the system further comprises computer readable code means for determining whether all devices in the second pool are compromised devices and, if not, causing devices in the second pool to generate a new session key.

8. The system of claim 5, wherein a first set of non-compromised devices defines a first pool and wherein a second set of non-compromised devices defines a third pool such that each of the first and third pools do not contain any compromised device, the system further comprising computer readable code means for causing devices in the first pool to replace their session key with the session key of the devices in the third pool.

9. A computer including a data storage device including a computer usable medium having computer usable code means for encrypting digital programs for broadcast thereof, the computer usable code means having:

computer readable code means for accessing a matrix of device keys $S_{j,i}$, i=the integers from 1 to N inclusive, j=the integers from 1 to M inclusive, wherein "i" is a key index variable indicating a position in a key dimension of the matrix, "j" is a sets index variable indicating a position in a sets dimension of the matrix, and "N" is the number of device keys in each of M sets of keys;

computer readable code means for assigning respective plural device keys from the matrix of device keys to a plurality of digital video devices, each video device being assigned one and only one device key for each key index variable "i";

computer readable code means for generating plural session numbers $x_i$, i=1 to N, each session number $x_i$ corresponding to a respective key index variable "i";

computer readable code means for encrypting each session number $x_i$ with all device keys $S_{j,i}$, j=1 to M, to generate a session key block;

computer readable code means for determining whether one or more of the devices is a compromised device; and computer readable code means for rendering at least one of the session numbers as a dummy number, the dummy number being encrypted by at least one compromised device key of the compromised device.

10. The computer of claim 9, wherein first digital video devices decrypt at least portions of the session key block to generate a first session key, the first digital video devices defining at least a first pool, and wherein second digital video devices decrypt at least portions of the session key block to generate a second session key, the second digital video devices defining at least a second pool, the computer further comprising:

computer readable code means for determining whether all devices in the first pool are not compromised devices and, if so, sending renewal data to the devices in the first pool, the devices in the first pool operating on the renewal data to generate new device keys.

11. The computer of claim 9, wherein second digital video devices decrypt at least portions of the session key block to generate a second session key, the second digital video devices defining at least a second pool, the computer further comprising computer readable code means for determining whether all devices in the second pool are compromised devices and, if not, causing devices in the second pool to generate a new session key.

12. The computer of claim 9, wherein a first set of non-compromised devices defines a first pool and wherein a second set of non-compromised devices defines a third pool such that each of the first and third pools do not contain any compromised device, the computer further comprising:

computer readable code means for causing devices in the first pool to replace their session key with the session key of the devices in the third pool.

13. The computer of claim 9, in combination with the digital video devices.

14. A computer-implemented method for secure transmission of one or more broadcast programs, comprising:

providing to plural user devices plural computer-usable device keys selected from a set of device keys;

generating at least one session key block generator encrypting plural session numbers with the set of device keys to render a session key block;

defining at least one of the session numbers to be a dummy number when it is determined that at least one of the devices is a compromised device defining compromised device keys;

encrypting the dummy number with a compromised device key;

transmitting the session key block for use in decrypting the program;

accessing the device keys of each device to determine a session key based on the session key block and the respective device keys of the device, the session key being usable by a user device to decrypt the program unless the device uses the dummy number to generate the session key.

15. The method of claim 14, wherein the set of device keys is representable by at least a two-dimensional matrix including a key dimension and a sets dimension, wherein the key dimension represents "N" key positions each represented by a key index variable "i", and wherein the sets dimension represents "M" sets each represented by a sets index variable "j", such that each device key can be represented by $S_{j,i}$.

16. The method of claim 15, wherein no two device keys of a device have the same key index variable "i" as each other.

17. The method of claim 16, comprising:

providing a respective session number for each key index variable "i" such that each session number can be represented by $x_i$; and encrypting each session number $x_i$ only with device keys in the $i^{th}$ key dimension to render the session key block.

18. The method of claim 17, wherein each device uses its respective $i^{th}$ device key $S_{j,i}$ to decrypt the $i^{th}$ session number, such that all devices not having the compromised device key generate at least a first session key and all devices having the compromised device key generate at least a second session key, only the first session key being useful in decrypting the program.

19. The method of claim 18, wherein devices generating the first session key define at least a first pool and devices generating the second session key define at least a second pool, the method further comprising:

determining whether all devices in the first pool are not compromised devices and, if so, sending renewal data to the devices in the first pool, the devices operating on the renewal data to generate new device keys.

20. The method of claim 18, wherein devices generating the second session key define at least a second pool, and the method further comprises:

determining whether all devices in the second pool are compromised devices and, if not, causing devices in the second pool to generate a new session key.

21. The method of claim 18, wherein a first set of non-compromised devices defines a first pool and wherein a second set of non-compromised devices defines a third pool such that each of the first and third pools do not contain any compromised device, the method further comprising:

causing devices in the first pool to replace their session key with the session key of the devices in the third pool.

22. A computer program device comprising:

a computer program storage device readable by a digital processing apparatus; and a program means on the program storage device and including instructions executable by the digital processing apparatus for performing method steps for encrypting digital programs for broadcast thereof, the method steps comprising:

accessing a matrix of device keys $S_{j,i}$, i=the integers from 1 to N inclusive, j= the integers from 1 to M inclusive, wherein "i" is a key index variable indicating a position in a key dimension of the matrix, "j" is a sets index variable indicating a position in a sets dimension of the matrix, and "N" is the number of device keys in each of M sets of keys;

assigning respective plural device keys from the matrix of device keys to a plurality of digital video devices, each video device being assigned one and only one device key for each key index variable "i";

generating plural session numbers $x_i$, i=1 to N, each session number $x_i$ corresponding to a respective key index variable "i"; and encrypting each session number $x_i$ with all device keys $S_{j,i}$, j=1 to M, to generate a session key block;

determining whether one or more of the devices is a compromised device; and rendering at least one of the session numbers as a dummy number, the dummy number being encrypted by at least one compromised device key of the compromised device.

23. The computer program device of claim 22, wherein first digital video devices decrypt at least portions of the session key block to generate a first session key, the first digital video devices defining at least a first pool, and wherein second digital video devices decrypt at least portions of the session key block to generate a second session key, the second digital video devices defining at least a second pool, the method steps further comprising:

determining whether all devices in the first pool are not compromised devices and, if so, sending renewal data to the devices in the first pool, the devices in the first pool operating on the renewal data to generate new device keys.

24. The computer program device of claim 22, wherein second digital video devices decrypt at least portions of the session key block to generate a second session key, the second digital video devices defining at least a second pool, the method steps further comprising determining whether all devices in the second pool are compromised devices and, if not, causing devices in the second pool to generate a new session key.

25. The computer program device of claim 22, wherein a first set of non-compromised devices defines a first pool and wherein a second set of non-compromised devices defines a third pool such that each of the first and third pools do not contain any compromised device, the method steps further comprising:

causing devices in the first pool to replace their session key with the session key of the devices in the third pool.

26. The computer program device of claim 22, in combination with the digital video devices.

\* \* \* \* \*